Jan. 16, 1940.                    S. B. MARTIN                    2,187,090
                                    PUSHER
                              Filed March 2, 1939
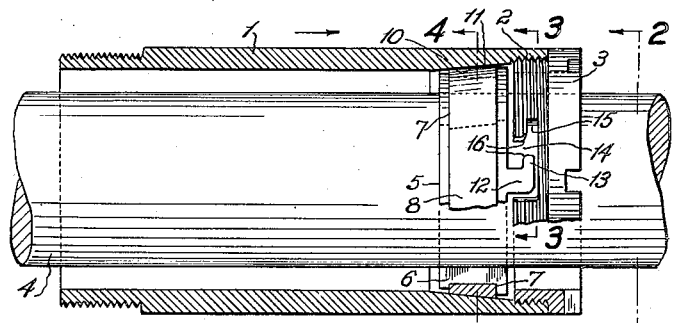
Fig. 1
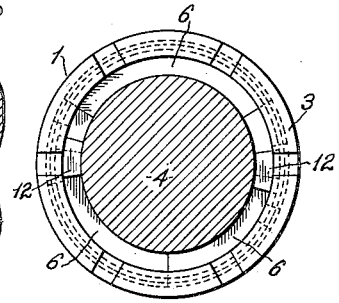
Fig. 2
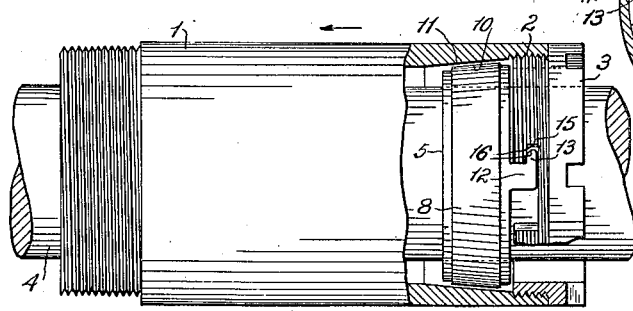
Fig. 5
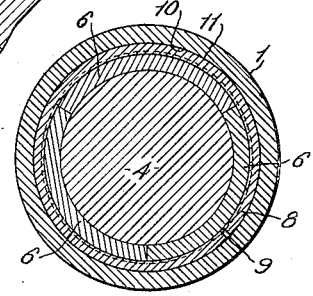
Fig. 4
Fig. 3
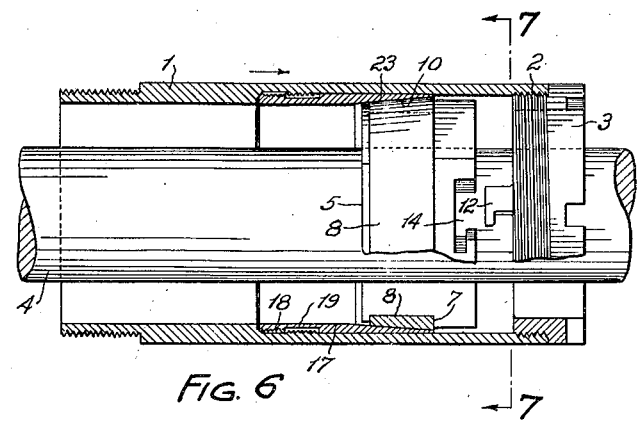
Fig. 6
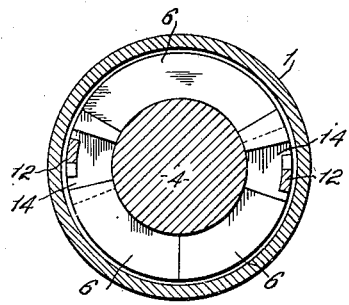
Fig. 7
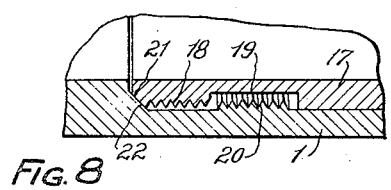
Fig. 8
Stoddard B. Martin
INVENTOR:
By Hawgood & Van Horn
HIS ATTORNEYS.

Patented Jan. 16, 1940

2,187,090

UNITED STATES PATENT OFFICE 2,187,090

PUSHER

Stoddard B. Martin, Lakewood, Ohio

Application March 2, 1939, Serial No. 259,419

12 Claims. (Cl. 29—62)

My invention is an improvement in pushers for screw machines.

It is one of the objects of this invention to provide a pusher for screw machines which is characterized by the fact that its gripping action upon the bar stock passing therethrough may be released by rotation of the bar, which is being fed.

Another object is to provide a pusher of this type having means for gripping the bar stock to feed the same forwardly through the work spindle, but releasable manually to permit the bar to be withdrawn from the pusher tube.

It is a further object of the invention to provide releasable means within the pusher having primary and secondary gripping actions in which the primary gripping action is utilized through a suitable bushing to grip the bar stock in feeding the same through the pusher and in which the secondary gripping action is effective to releasably hold the pusher tube, bar stock and bushing against relative axial movement.

A still further object of the invention resides in providing a gripping bushing for releasably gripping bar stock fed through the pusher in which the bushing consists of a segmental annulus, and a resilient member binding the segments together in gripping relation on the bar stock, said resilient member having gripping engagement with the pusher Another object of the invention consists in a pusher having positive bar stock feeding action which is releasable from the rear end of the pusher tube by manually turning the bar stock in an opposite direction of rotation to that of the spindle.

A still further object resides in a pusher of the class described provided with a bushing for releasably gripping the bar stock and the pusher tube in which said bushing is provided with a member having tapered walls engageable with an annular tapered wall of the pusher.

Another object is to construct a pusher for feeding bar stock and having the above objects and advantages and which is simple of construction, positive in operation, and inexpensive to manufacture.

These and other objects and advantages of my invention will be more readily understood from the following description of several embodiments of my invention, reference being made to the accompanying drawing in which like reference characters are employed to designate like parts throughout the same.

In the drawing:

Figure 1 is a longitudinal section through a pusher illustrating one embodiment of my invention, showing some of the parts in elevation;

Figure 2 is a transverse section taken on line 2—2 of Figure 1;

Figure 3 is a fragmentary section taken in the direction of line 3—3 of Figure 1;

Figure 4 is a transverse section taken on line 4—4 of Figure 1;

Figure 5 is a view similar to Figure 1 and shows the gripping means released to permit removal of the bar stock from the tube;

Figure 6 is a longitudinal section through a second embodiment of my invention;

Figure 7 is a transverse section taken on line 7—7 of Figure 6; and

Figure 8 is an enlarged fragmentary section showing the taper seat member of hardened metal carried within the pusher.

Referring now more particularly to Figures 1 to 5 inclusive, of the accompanying drawing, which illustrates the first embodiment of my invention, I have shown the pusher generally at 1. The forward end of the pusher is threaded internally at 2 to receive a threaded nut 3.

The bar stock 4 passes axially through the pusher and the nut and is fed by intermittent axial movement through a collet ahead of the pusher. It is essential, in feeding the bar stock forwardly, to provide means within the pusher for positively gripping the said bar during forward movement of the pusher tube so that the bar may be fed. It is also necessary that this gripping means shall be releasable to permit relative movement between the pusher and the stock as the pusher tube returns from the full feeding position.

Sometimes it becomes desirable to remove a length of bar rearwardly through the pusher. This can only be done with great difficulty in pushers of which I am aware and an important advantage of my invention is that the ease with which the bar can be pulled back manually through the pusher tube. Furthermore, my invention, due to its positive action, will be affected very little by wear and will feed the bar with greater accuracy because of the impossibility of the bar rebounding through the pusher. This is especially true on long work.

By my invention I have eliminated the most objectionable difficulty heretofore experienced with pushers and have provided a pusher having positive stock gripping means as well as means by which the bar may be released for backward movement in the tube.

In the present embodiment, Figures 1 to 5 inclusive, I provide a novel means for gripping the bar stock which includes a cylindrical bushing 5 comprising a plurality of segments 6 which when assembled in the pusher as illustrated, receive and axially control the bar 4 in the pusher.

Each segment is grooved or recessed along its outer surface to provide an annular recess or seat 7 when the bushing is assembled. The segments 6 are bound together or contracted radially into gripping relation with the bar by means of a resilient band 8 split transversely at 9 to permit expansion and contraction of the segments radially with respect to the bar 4.

This resilient band is formed of spring steel and seats in the recess 7 of the assembled bushing segments. The outer peripheral face or wall of the resilient band is tapered as at 10 inwardly toward the rear of the pusher and is frictionally engageable with a similarly tapered wall 11 formed on the inner wall of the pusher. Thus it will be seen that rebound of the stock or forward movement of the pusher will through the tapered walls 10 and 11, exert a uniform inward radial thrust, directly upon the bushing segments 6 thereby causing them to positively grip the stock bar 4.

I have also illustrated means whereby the positive grip of the bushing on the bar may be released sufficiently to permit the pusher to be withdrawn to the left, or to permit the bar to be withdrawn manually to the left.

This means comprises a releasable interlock connection between the nut 3 in the forward end of the pusher and the segmental bushing 5. In carrying out this feature of the invention, I provide a pair of projections 12 diametrically disposed on the forward end of the bushing and extending forwardly of the bushing segments. Each projection is provided with a locking portion 13 lying in a circumferential direction. The nut 3 is provided with a pair of openings 14 in the rear end thereof for receiving the projections 12. The openings 14 are milled back at 15 to provide a locking seat for receiving the locking portions 13 of the bushing projections. It is desirable that the engaging walls of the parts 13 and 15 be rounded or bevelled as at 16 to guide the parts into interlocking engagement when the bar is rotated in a reverse direction to that of the spindle.

Thus, during normal operation of the pusher, the bar will be fed forward through a collet by a movement of the pusher to the right in Figure 1. As a result of such movement, the primary gripping action of the contracted segmental bushing on the bar will be greatly enhanced by the inward radial forces or secondary gripping action exerted through the tapered walls 10 and 11 of the pusher shell 1 and the resilient band 8 respectively.

In this manner the bar is positively fed forwardly. When the pusher returns after the collet has gripped the length of stock just fed forwardly, the secondary gripping forces will be released since the tapered walls 10 and 11 will be disengaged. To remove the bar to the left it is necessary to overcome the secondary gripping action of the segmental bushing on the bar. This is accomplished by manually pushing the bar forward as in Figure 5 rotating the bar and the bushing in a direction reverse to that of the work spindle so that the projections 12 will enter the openings 14 in the end of the nut 3.

Further rotation of the bar in the said reverse direction will interlock the parts 13 and 15, thus maintaining the tapered wall 10 of the band out of engagement with the tapered wall of the pusher. An axial manual pull on the bar to the left will easily overcome the gripping action of the bushing on the bar and the bar can thus be removed, while the interlocked nut and bushing are so engaged.

In connection with my invention I may replace the tapered wall 11 of the pusher by an insert of hardened metal. To accomplish this the inner cylindrical wall of the pusher may be recessed annularly and the insert of hardened metal removably seated in the seat. The insert, of course, is to be provided with an inner tapered wall similar to the wall 11 of the pusher.

In Figures 1 to 5 it will be noted that I have shown the interlock connection between the bushing 5 and the nut as comprising a tongue or projection 12—13 on the bushing insertable in a milled opening 14—15 in the nut 3.

This arrangement may be reversed as indicated in Figure 6, wherein the projection of the interlock is carried by the nut and the opening is milled in the rim of the bushing. Either arrangement is quite satisfactory in use.

In Figures 6, 7, and 8 I have illustrated a modification of the present invention. I have provided in place of the tapered internal wall 11 of the pusher, or the hardened tapered metal insert just described, a taper seat member or sleeve 17 of hardened metal which is adapted to be inserted through the front end of the pusher. An advantage of this form of the invention is that when the collet is gripping the bar, the bar is free to rotate with the holding bushing independently of the pusher outer shell 1.

As illustrated in Figures 6, 7, and 8, the taper seat sleeve 17 is cylindrical and continuous in cross section. The member is externally threaded at 18 at its rear end and is recessed annularly at 19. The sleeve 17 is inserted through the forward end of the pusher and is threaded past the threads 20 formed internally of the pusher so that the recess 19 will overlie the threads 20 as indicated in Figure 8. The end of the sleeve is provided with a bevelled bearing surface 21 which abuts the bevelled surface 22 of the pusher when the pusher is thrust forwardly in feeding the bar 4.

It will be noted that the internal wall 23 of the sleeve extending from the front end thereof rearwardly is inclined in a long taper in which the said wall converges toward the rear end of the sleeve, thus providing an inclined gripping surface engageable with the correspondingly inclined or bevelled surface 10 of the resilient band 8. As has been described before, the band 8 lies in a peripheral recess formed in the assembled bushing segments or pads 6 and binds them together to grip the bar 4 passing therethrough.

The bushing 5 may be interlocked with the nut 3 in the manner heretofore described.

It will readily be seen that with this embodiment of the invention the bar 4 is free to rotate with the holding bushing 5 independently of the pusher shell 1 when the collet is gripping the bar, due to the freedom of the sleeve 17 to rotate in the pusher.

The bar may be manually removed rearwardly of the pusher in the manner described in connection with the embodiment shown in Figures 1 to 5 inclusive.

By this invention I have provided another novel advantage. Sometimes the diameter of the bar varies slightly and this is particularly true in changing from a cold to hot rolled bar stock in a given diameter bushing. By reason of the tapered walls 10 and 11 or 10 and 23 any slight variation in the diameter of the bar passing through the gripping bushing will be compensated for without interference with the secondary gripping forces applied through the resilient band and the bushing as the pusher moves forward to feed the bar.

Various changes in the details of construction and arrangement of parts may be made without departing from the spirit of my invention or the scope of the appended claims.

I claim:

1. In a pusher for feeding bar stock; means within the pusher for positively gripping said stock when the pusher is moved in one axial direction, and means associated with said first named means and having interfitting connection therewith for releasing said stock in the pusher when said stock is rotated in one direction.

2. In a pusher, a bushing within the pusher for gripping a bar passing axially therethrough, said pusher having a part engageable with the bushing to exert a positive inward gripping force on said bar when the bar is fed forwardly and interfitting means on said bushing and said pusher for releasing said positive gripping force when the bar is manually turned in one direction in said pusher, thereby permitting removal of the bar.

3. A pusher for screw machines including a bushing, said bushing comprising a plurality of segments, a resilient band for contracting said segments in gripping relation about a bar, a tapered annular wall in the pusher, said band having a tapered outer annular face for positive engagement with the tapered wall of the pusher when the pusher is moved to feed the bar, to thereby exert uniform radial gripping forces upon said bar, and means carried by the pusher and having interlocking engagement with the bushing when said bushing is rotated in one direction to thereby release said positive grip on the bar and permit removal of the bar from the pusher.

4. A pusher for screw machines including a bushing, said bushing comprising a plurality of segments, a resilient band for contracting said segments in gripping relation about a bar, a tapered annular wall in the pusher, said band having a tapered outer annular face for positive engagement with the tapered wall of the pusher when the pusher is moved to feed the bar, to thereby exert uniform radial gripping forces upon said bar, a nut in the forward end of said pusher, and means for releasing said positive grip on the bar, said means including an interlock connection between the nut and bushing and operable to release the positive grip on the bar when the bar is rotated in one direction.

5. In a pusher for feeding bar stock, means within and actuated by the pusher for positively gripping said bar when the pusher is moved in a direction to feed the stock through a collet, and means carried by said pusher and having interlocking engagement with said first named means for releasing said positive grip when the bar is manually rotated in the pusher.

6. In a pusher for feeding bar stock, means within and actuated by the pusher for positively gripping said bar when the pusher is moved in a direction to feed the stock through a collet, said means including a bar gripping bushing, an annulus on the bushing having a tapered outer surface for engagement with a similarly tapered portion of the internal wall of the pusher, and means carried by said pusher and having interlocking engagement with said first named means for releasing said positive grip when the bar is manually rotated in the pusher.

7. In a pusher for feeding bar stock, means within and actuated by the pusher for positively gripping said bar when the pusher is moved in a direction to feed the stock through a collet, said means including a bar gripping bushing, an annulus on the bushing having a tapered outer surface, a hardened metal annular insert within said pusher having a tapered wall for gripping engagement with the tapered wall of the bushing annulus, and means carried by said pusher and having interlocking engagement with said first named means for releasing said positive grip when the bar is manually rotated in the pusher.

8. In a pusher for feeding bar stock, means within and actuated by the pusher for positively gripping said bar when the pusher is moved in a direction to feed the stock through a collet, said means including axially telescoping tapered gripping members, and means carried by said pusher and having interlocking engagement with said first named means for releasing said positive grip when the bar is manually rotated in the pusher.

9. In a pusher for feeding bar stock, means within and actuated by the pusher for positively gripping said bar when the pusher is moved in a direction to feed the stock through a collet, said means including a sleeve freely rotatable in said pusher but restricted as to axial movement therein, a bar gripping bushing, an annulus on the bushing having a tapered outer surface, said sleeve having a similarly tapered surface engageable with that of the annulus, and means carried by said pusher and having interlocking engagement with said first named means for releasing said positive grip when the bar is manually rotated in the pusher.

10. In a pusher for feeding bar stock means within and actuated by the pusher for positively gripping said bar when the pusher is moved in a direction to feed the stock through a collet, said means including a sleeve freely rotatable in said pusher but restricted as to axial movement therein, a bar gripping bushing, an annulus on the bushing having a tapered outer surface, said sleeve having a similarly tapered surface engageable with that of the annulus, and means within the pusher for separating and/or holding said tapered surfaces apart.

11. In a pusher for feeding bar stock, means within and actuated by the pusher for positively gripping said bar when the pusher is moved in a direction to feed the stock through a collet, and means carried by the pusher and engageable by said first named means for releasing said gripping means.

12. In a pusher for feeding bar stock, means within and actuated by the pusher for positively gripping said bar when the pusher is moved in a direction to feed the stock through a collet, said means including a bar gripping bushing, an annulus on the bushing having a tapered outer surface, and means carried by the pusher and engageable with a portion of the bushing for separating and/or holding said tapered surfaces apart.

STODDARD B. MARTIN.